(12) United States Patent  
Merry

(10) Patent No.: US 9,349,209 B2
(45) Date of Patent: May 24, 2016

(54) GRAPHICS PROCESSING SYSTEMS

(75) Inventor: Bruce Merry, Cape Town (ZA)

(73) Assignee: ARM LIMITED, Cambridge (GB)

( * ) Notice: Subject to any disclaimer, the term of this patent is extended or adjusted under 35 U.S.C. 154(b) by 1027 days.

(21) Appl. No.: 13/117,413

(22) Filed: May 27, 2011

(65) Prior Publication Data

US 2012/0299943 A1    Nov. 29, 2012

(51) Int. Cl.
*G06T 15/50* (2011.01)
*G06T 15/60* (2006.01)
*G06T 15/00* (2011.01)
*G06T 15/80* (2011.01)

(52) U.S. Cl.
CPC ............... *G06T 15/005* (2013.01); *G06T 15/80* (2013.01); *G06T 15/50* (2013.01)

(58) Field of Classification Search
CPC ..................... G06F 15/00; G06T 1/00–1/0092; G06T 1/20; G06T 15/50–15/506; G06T 15/60
USPC .......................................... 345/426, 501, 506
See application file for complete search history.

(56) References Cited

U.S. PATENT DOCUMENTS

| 8,212,840 B2 * | 7/2012 | Jiao et al. ....................... 345/620 |
| 2008/0094410 A1 * | 4/2008 | Jiao et al. ....................... 345/592 |
| 2012/0007878 A1 | 1/2012 | Jones |

FOREIGN PATENT DOCUMENTS

| EP | 1182548 | 2/2002 |
| GB | 2429084 | 2/2007 |

OTHER PUBLICATIONS

Search Report dated Oct. 6, 2010, UK Patent Application No. GB1011419.7.
Open GL discussion forum, Mar. 5, 2008, http://www.opengl.org/discussion_boards/showthread.php/164193-Reading-from-gl_FragColor?p=1160270.
Open GL discussion forum, Dec. 15, 2008-Jan. 7, 2009, http://www.opengl.org/discussion_boards/showthread.php/166294-Make-the-blend-stage-to-become-programmable?p=1175309.

* cited by examiner

*Primary Examiner* — Jacinta M Crawford
(74) *Attorney, Agent, or Firm* — Vierra Magen Marcus LLP

(57) ABSTRACT

A graphics processing pipeline includes a fragment shader 8 and can carry out blending either by means of a blend shading software routine in a blend shader 10, or by using fixed function, dedicated processing hardware blending units 12. When the programmable blend shading path using the blend shader 10 is selected, the blend shader 10 is configured to provide the alpha value 110 generated by the fragment shading operation as an output to the multisample coverage operations unit 105 and the alpha test unit 106 of the fixed function hardware unit pipeline. This allows the alpha test on the alpha values generated by the fragment shader 8 still to be performed using the multisample coverage operations hardware unit 105 and the alpha test hardware unit 106, instead of having to emulate those operations in the blend shading software routine in the blend shader 10.

15 Claims, 6 Drawing Sheets

54

BRNDEND (target)

if (dependencies satisfied)

if (blend_shader_enabled && in_fragment_shader)

in_fragment_shader = false branch to blend_shader_address else output colour value terminate thread else branch to target

FIG. 6

GRAPHICS PROCESSING SYSTEMS

BACKGROUND

The technology described herein relates to graphics processing systems, and in particular to graphics processing systems that include programmable blending functionality.

As is known in the art, two important operations in graphics processing (e.g., when processing computer graphics for display, e.g., on a screen or printer) are so-called "fragment shading" and "blending".

As is known in the art, graphics processing is normally carried out by first dividing a scene to be displayed into a number of similar basic components (so-called "primitives") to allow the graphics processing operations to be more easily carried out. These "primitives" are usually in the form of simple polygons, such as triangles.

To then process the primitives for display, it is first determined which sampling points of an array of sampling points covering the scene area to be processed are covered by a primitive (this process is commonly referred to as rasterising). The sampling points for a primitive are typically then represented as discrete graphical entities usually referred to as "fragments" on which subsequent graphics processing operations are carried out. Each sampling point will, in effect, be represented by a fragment that will be used to process the primitive at the sampling point in question. The "fragments" are the graphical entities that pass through the graphics process (the graphics pipeline).

An important part of the fragment processing is to determine the appearance that each sampling point that the fragment represents should have (e.g. in terms of its colour, etc.) to represent the primitive at that sampling point. This process involves "shading" (rendering) the fragment in question and is commonly referred to as "fragment shading".

The fragment shading process thus derives data, such as red, green and blue (RGB) colour values and an "Alpha" (transparency) value, necessary to display the primitive at the sample points (i.e. "shades" each fragment). This can involve, as is known in the art, applying textures, combining fragment data values, etc.

Fragment shading may be carried out using fixed-function hardware, or by means of a software routine running a programmable processor. The latter case is commonly referred to (as is known in the art) as a "fragment shader".

Blending typically involves taking newly generated fragment data (i.e. the results of the fragment shading) and blending it appropriately with data that has previously been generated for the fragment position(s) in question, e.g., that is stored in some output buffer, such as a tile buffer of a tile-based graphics processing system, to generate new, modified ("blended") fragment data for the fragment position(s) in question.

As blending is an important and common operation in graphics processing, graphics processors and graphics processing systems typically include one or more fixed-function, hardware units, that are configured to perform (and accelerate) the blending process. These blending hardware units or stages are typically part of the graphics processing, e.g., rendering, pipeline.

However, it can also be possible to carry out blending in software running on a programmable processor of or that is associated with the graphics processor or graphics processing system. For example, a graphics processor may include a so-called "blend shader" that is operable to execute one or more blend shading programs (software routines) to perform graphics blending operations. Blend shaders can be used, e.g., to perform blending operations that may not, e.g., be directly supported by the fixed function blending hardware of a graphics processor.

The Applicants believe that there remains scope for improvements to graphics processing systems that include programmable blending functionality (i.e. the ability to perform blending using software routines or programs running on a programmable processor).

BRIEF DESCRIPTION OF THE DRAWINGS

A number of embodiments of the technology described herein will now be described by way of example only and with reference to the accompanying drawings, in which:

FIG. 6 is pseudo-code illustrating the functionality of an end instruction in accordance with one embodiment of the present techniques.

Like reference numerals are used for like features throughout the figures where appropriate.

DETAILED DESCRIPTION

Figure 1:
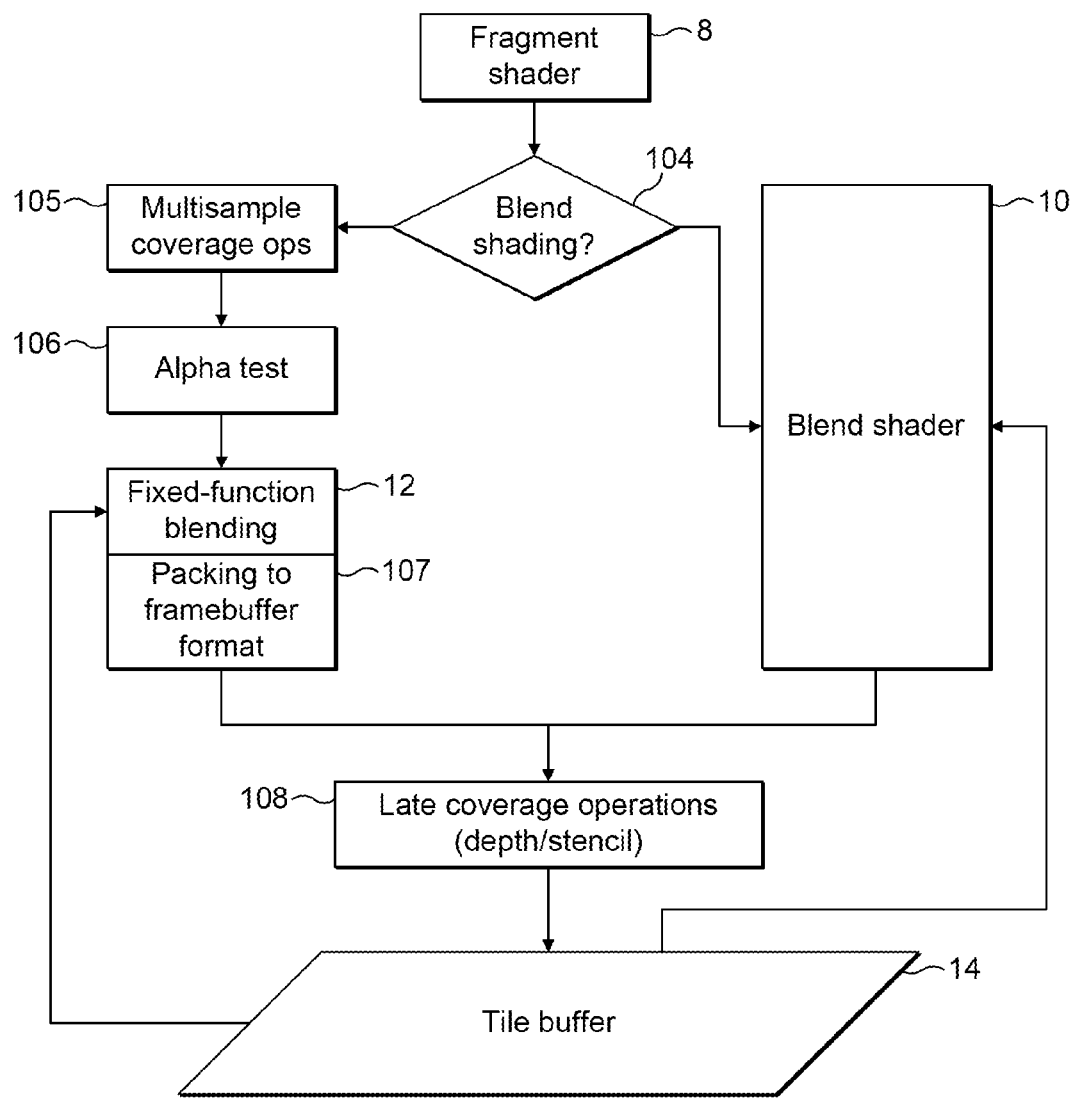
FIG. 1 shows schematically a graphics processing system to which the technology described herein can be applied.

One embodiment of the technology described herein comprises a method of operating a graphics processing system in which, following fragment shading operations, blending may be performed either using fixed-function blending hardware or by performing a blending software routine, the method comprising:

when performing blending using a blending software routine, still providing at least some data generated by the fragment shading operation to dedicated function hardware of the graphics processing system for processing by the dedicated function hardware to generate hardware generated result data from the at least some data generated by the fragment shading operation.

Another embodiment of the technology described herein comprises a graphics processing apparatus comprising:

processing circuitry configured to perform graphics fragment shading operations and operable to perform graphics blending software routines to blend output data from the graphics fragment shading operations with previously stored graphics data to generate modified graphics fragment output data; and dedicated function hardware configured to receive output data from said fragment shading operations and to perform dedicated processing operations upon the fragment shading output data, the dedicated processing operations including at least graphics blending operations to blend output data from the graphics shading operations with previously stored graphics data to generate modified graphics fragment output data;

wherein the graphics processing apparatus is configured such that the graphics blending operations on the output data from the graphics fragment shading operations may be selectively performed either using the dedicated function hardware or by means of a blending software routine performed by the processing circuitry;

wherein the graphics processing apparatus is further configured to, when performing blending using a blending software routine performed by the processing circuitry, still provide at least some data generated by the fragment shading operation to the dedicated function hardware of the graphics processing apparatus for processing by the dedicated function hardware to generate hardware generated result data from the at least some data generated by the fragment shading operation.

The technology described herein relates to graphics processing systems that are able to perform blending operations in software (i.e. using blending software routines executed on a programmable processor). However, in the technology described herein, when the blending operation is being carried out using a software routine, at least some of the output data from the fragment shading operations is still provided to the dedicated (fixed-function) hardware of the graphics processor for processing.

The Applicants have recognised that even though it would be possible when using programmable (software) blending operations in graphics processing to emulate in software all the relevant graphics processing operations that would normally be carried out using the fixed function hardware, it may still be desirable to carry out some operations using the fixed function hardware. For example, it may be more efficient to carry out some operations using the fixed function (dedicated) hardware than to emulate the fixed function (dedicated hardware) process in software. This can then, e.g., reduce the power that is required for these operations (which may be particularly beneficial in lower power and/or portable devices).

Thus, the Applicants have recognised that even if using programmable blending, it can still be advantageous to make use of at least some of the fixed function hardware units of the graphics processor (of the graphics processing pipeline).

The technology described herein facilitates this by, when blending is being carried out using a software routine, still providing some of the output data from the fragment shading operations to the fixed-function, dedicated processing hardware of the graphics processing apparatus for processing (and processing that data using the dedicated processing hardware).

Thus, the technology described herein provides a graphics processing system in which blending can be performed using either dedicated blending hardware, or by means of a software routine, but in the latter case, some data from the fragment shading is still provided to the dedicated hardware of the graphics processor for processing.

One example of where the technology described herein may be particularly advantageous is in the case of the so-called "alpha" (transparency) test and other alpha-value-related operations (such as alpha-to-coverage). Many graphics processing systems include dedicated hardware for performing these alpha-related operations. These alpha-value operations typically use the alpha values output by the fragment shading operation. While it would be possible to emulate these operations in software where blending is being done in software, the Applicants have recognised that it can be more efficient to still perform the alpha-value related operations using the fixed function (dedicated) hardware that is provided for that purpose. As discussed above, the technology described herein facilitates this by allowing the alpha value data from the fragment shading operations to still be provided to the fixed function hardware of the graphics processing apparatus when programmable blending (i.e. blending by means of a software routine) is being used.

The graphics fragment shading operations can comprise any suitable and desired such operations. They should, as discussed above, at least generate output data, such as colour (e.g. (RGB) and alpha (transparency)) values for the fragment in question. They may be carried out using fixed (dedicated) function hardware or by fragment shader software routines, as desired. Thus the processing circuitry that is configured to perform the graphics fragment shading operations may comprise processing circuitry that is dedicated for that purpose, or a programmable processor (processing circuitry) that can execute fragment shading software routines. In an embodiment, the fragment shading operations are performed by means of fragment shading software routines, i.e. the graphics processing apparatus includes a so-called "fragment shader".

The blending software routines may be performed, e.g., by the same programmable processor (processing circuitry) as performs the fragment shading software routines (where the fragment shading is done in that manner), or there could be a separate programmable processor (processing circuitry) that executes the blending software routines. In the former case, there would, in effect, be (and the processing circuitry would comprise) a common programmable processor that performs both the fragment shading and programmable blending operations. This will avoid the overhead and complication of having to switch processors as well as ensuring that data generated by the fragment shading software routine is available for use by the blending (blend shading) software routine.

The processing performed by the system may be multi-threaded. There may be multiple threads running on a single processor as well as multiple threads spread across multiple processors.

Also, the processing circuitry could comprise a single processor responsive to a stream of program instructions. Alternatively, the processing circuitry could comprise a plurality of processors (e.g. each coupled to a respective instruction decoder). Each processor may then be responsive to its own stream of program instructions. This would provide a parallel execution environment.

There could be both a "fragment shader" and a separate "blend shader", or there could be a single "shader" that does both the fragment shading and blending shading (such that, in effect, the blend shading routine runs with the fragment shader). (In the former case, the two "shaders" (fragment and blend) will be stored independently, and the processor given two separate instruction streams (one for each shader). In the second case, the two logical shader phases will be combined into a single program, e.g., by software (e.g. running on the CPU rather than the GPU), and the processor given a single stream of instructions.)

The technology described herein accordingly is applicable to, and extends to, graphics processing systems that support programmable blending (i.e. blending by means of software routines) in any manner, e.g., where the blending software routine is performed by the fragment shader, or by a separate blend shader, or in any other way.

The dedicated (fixed function) hardware of the graphics processing apparatus can perform any desired and suitable processing operations on the fragment shading output data. These operations should include at least graphics blending operations, but in an embodiment also include further graphics processing operations, such as, and in an embodiment, one or more of an alpha test, multisample coverage operations, alpha-to-coverage operations, and packing to the frame buffer format (including, e.g., colour-space conversion (e.g. linear to sRGB)). Thus, in an embodiment, the dedicated function hardware includes one or more of: an alpha test unit, a multisample coverage operations unit, an alpha-to-coverage unit, and a packing to frame buffer unit. In an embodiment it includes at least an alpha test unit as well as a (fixed-function) blending unit.

The dedicated blending function hardware should, as is known in the art, be responsive to the output fragment data (e.g. colour) value from the fragment shading operations and at least a current data (e.g. colour) value stored in memory (e.g. in a tile buffer or a frame buffer) to generate a result fragment data (e.g. colour) value to be stored within the memory in place of the current data (e.g. colour) value. (Similarly, the blending software routine (programmable blending) which may be triggered should be responsive to the output fragment data (e.g. colour) value from the fragment shading operations and at least a current data (e.g. colour) value stored in memory (e.g. in a tile buffer or a frame buffer) to generate a result fragment data (e.g. colour) value to be stored within the memory in place of the current data (e.g. colour) value.) The current data (e.g. colour) value that is stored in memory (and that is blended with the new fragment value) may, as is known in the art, be a data value that has been generated for a previous fragment, a data value from another source (such as a background colour), or a previously blended value, etc.

The dedicated function hardware may be responsive to one or more configuration parameters to modify the dedicated processing operation performed by the dedicated function hardware. Thus, the dedicated function hardware is capable of some variation in the processing it performs, but is not as flexible as a general purpose processor executing a stream of program instructions.

The at least some data generated by the fragment shading operations that is provided to (and processed by) the dedicated function hardware when programmable blending (blending using a software routine) is being carried out can be any suitable such data and can be selected as desired. In an embodiment, this data is the alpha value that is generated by the fragment shading operations for a fragment (for each fragment). As discussed above, the Applicants have recognised that still performing the Alpha test in hardware when using programmable blending can be more efficient and thus advantageous.

Similarly, the operation that is performed in hardware using the data from the fragment shading operation can be any suitable and desired such operation (e.g. depending upon the nature of the data). In an embodiment it is an alpha test operation. In an embodiment, an alpha-to-coverage operation is also or instead performed. In an embodiment, the hardware generated result data from these operations comprises sample coverage masks (as is known in the art), which are then forwarded to later stages of the graphics processing pipeline for use.

Thus, in an embodiment, the at least some data generated by the fragment shading operation that is provided to the dedicated function hardware when performing blending using a blending software routine comprises graphics alpha values (i.e. transparency-indicating data) generated by the fragment shading operations, and the dedicated function hardware performs alpha test and/or alpha-to-coverage (and in an embodiment both) operations on the alpha values to generate hardware generated alpha test and/or alpha-to-coverage result data, in an embodiment in the form of sample coverage masks, from the alpha value(s) generated by the fragment shading operation.

The data, such as the alpha values, generated by fragment shading operations can be passed to the dedicated function hardware in any suitable and desired manner. In one embodiment, the relevant output data (e.g. alpha output) of the fragment shading operation is automatically extracted by the dedicated function hardware. In an embodiment, this is done by the storing of the output data (e.g. alpha values) into a memory with such a store operation being detected in hardware and then triggering the operation of the dedicated processing hardware.

In another embodiment, an appropriate instruction, e.g., to write the fragment shading output data, such as the alpha value, to a specific register that the hardware will then pass to the fixed function hardware units, is included in a software routine that is being executed to process the fragments. This instruction could comprise, e.g., an instruction to write the relevant data value (e.g. alpha value) to a particular variable, with the compiler for the software routine then mapping that variable to a specific register that the hardware will pass to the fixed-function hardware units. Such a software instruction could be included, e.g., in the blending software routine (such that once the programmable blending is started, the data value is provided to the dedicated function hardware), or it could be included in the fragment shading software routine (where programmable fragment shading is being used) (in which case the fragment shader will, in effect, output the data value to the dedicated function hardware).

It would be possible to pass the fragment shading output data to the dedicated function hardware immediately that output data (e.g. alpha value) becomes available (e.g. is written to the appropriate register). Alternatively, the provision of the output data to the dedicated function hardware could be deferred, e.g., until the software blending operation has been finished (at which point it could be passed on to the dedicated function hardware along with the output data from the blending operation).

Where the fragment shading operation output value can be provided to the dedicated processing hardware by means of a software instruction, then in an embodiment that instruction can be specified by a user (a programmer) in a fragment shader software routine (i.e. this functionality is exposed to users). This would then allow users to use this mechanism as an extra output channel from the fragment shader. In this case, deferring the provision of the output data to the dedicated function hardware (as discussed above) would allow the user to make multiple replacement operations for the fragment shading output value (i.e., in effect, change their mind), with only the "correct" final value being processed in hardware. Alternatively, the hardware units could speculatively start processing the output values as they are generated, but restart each time a new output value is generated.

The selective use of the fixed-function, dedicated blending hardware, or a blending software routine, to perform the blending can be carried out in any suitable and desired manner. In an embodiment, a software processing flag is used to generate control signals to trigger the appropriate blending operation (i.e. either in hardware or by using programmable blending). In an embodiment, if the software processing flag has a first value, that triggers the dedicated blending function hardware to receive the fragment shading output data and to perform its dedicated blending processing operation to generate hardware generated blending result data, but if the software processing flag has a second value, that triggers the performance of (triggers the processing circuitry to perform)

a blending software routine upon the fragment shading output data to generate software generated blending result data instead of hardware generated blending result data.

Where the fragment shading is carried out by means of a fragment shader software routine, then in an embodiment the current fragment shader software routine ends with an end instruction and the instruction decoder responsible for decoding that end instruction is, in an embodiment, responsive to that end instruction and to the software processing flag indicating that a blending software routine should be used, to trigger execution of the blending software routine. (With the default behaviour otherwise being to use the dedicated blending function hardware.)

The technology described herein can be implemented in any suitable system, such as a suitably configured microprocessor based system. In an embodiment, the technology described herein is implemented in computer and/or microprocessor based system.

Subject to the requirements set out above, the various functions of the technology described herein can otherwise be carried out in any desired and suitable manner. Thus, for example, the various functional elements of the technology described herein may comprise a suitable processor or processors, controller or controllers, functional units, circuitry, processing logic, microprocessor arrangements, etc., that are operable to perform the various functions, etc., such as, as appropriate, dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor.

The technology described herein is applicable to any suitable form or configuration of graphics processor and graphics processing system and apparatus, such as processors having a "pipelined" arrangement and tile-based graphics processors.

The technology described herein accordingly extends to a graphics processor and a graphics processing platform including the apparatus of, or operated in accordance with the method of, any one or more of the embodiments of the technology described herein that are described herein. Subject to any hardware necessary to carry out the specific functions discussed above, such a graphics processor and graphics processing platform can otherwise include any one or more or all of the usual functional units, etc., that graphics processors, etc., include.

It will also be appreciated by those skilled in the art that all of the described aspects and embodiments of the technology described herein can include, as appropriate, any one or more or all of the preferred and optional features described herein.

The methods in accordance with the technology described herein may be implemented at least partially using software e.g. computer programs. It will thus be seen that further embodiments of the technology described herein comprise computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processing means causes in conjunction with said data processing means said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus a further embodiment of the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a graphics processing system to which the technology described herein can be applied. FIG. 1 is a simplified view of the relevant parts of the fragment processing pipeline. As will be appreciated by those skilled in the art, the overall graphics processing system can include units and functionality additional to that shown in FIG. 1.

As shown in FIG. 1, the graphics processing pipeline includes a fragment shader (a fragment shading stage) 8 which executes fragment shading software routines (programs) on a programmable processor to shade graphics fragments that are generated by rasterising graphics primitives to be rendered (as is known in the art). Fragment shading software routines are usually specified, as is known in the art, by the user (the programmer).

(As is known in the art, each graphics "fragment" that is shaded may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.)

Once the fragment shading operations have been completed, it is then necessary to carry out, as is known in the art, blending (or "blend shading") on the relevant fragment shading output data. Such blending, as is known in the art, blends (merges) the newly generated fragment data with data for the corresponding fragment positions (or for the corresponding sample positions which the fragment represents) that is already stored in memory. This already stored data may have been generated by previously processed fragments, be a background colour, etc. In the present embodiment, the memory 14 which stores the existing data is shown as a tile buffer (thus making the graphics processing system a tile-based graphics processing system). Other arrangements would, of course, be possible.

As shown in FIG. 1, the graphics processing system in the present embodiment supports carrying out the blending either by means of a blend shading software routine, which is shown as a blend shader 10, or by using fixed function, dedicated processing hardware blending units 12. A branch point 104 is shown at which it is determined (selected) whether to carry out the blending by means of a software routine in the blend shader 10, or by using the fixed function blending units 12. The mechanism for controlling which form of blending will be used is described in more detail below.

The blend shading software routine may, e.g., be executed on the same programmable processor as the fragment shader 8.

As well as the fixed function blending unit 12, the graphics pipeline also includes, as shown in FIG. 1, dedicated hardware 105 for carrying out multisample coverage operations, a dedicated alpha test hardware unit 106 and dedicated packing to frame buffer format hardware 107. The alpha-to-coverage and alpha test operations (hardware units) produce sample coverage masks, which are then forwarded to later stages in the pipeline.

As shown in FIG. 1, if the fixed function (hardware) blending operation is selected at the branch 104, then the output of the fragment shader 8 is provided to the hardware units for processing. On the other hand, if programmable blending (the blend shader 10) is selected, the output of the fragment shader 8 is provided to the blend shader 10.

Following on from either the fixed function (hardware) blending 12 or the programmable blending using the blend shader 10, are, as is known in the art, a set of late coverage operations 108 that perform, for example, late depth and stencil tests on the blended fragment data, before that data is written to the tile buffer 14.

The mechanism for controlling the selection of whether the blend shading takes place using a blending software routine in the blend shader 10 or the fixed function hardware blending unit 12 will now be described with reference to FIGS. 2 to 6.

Figure 2:
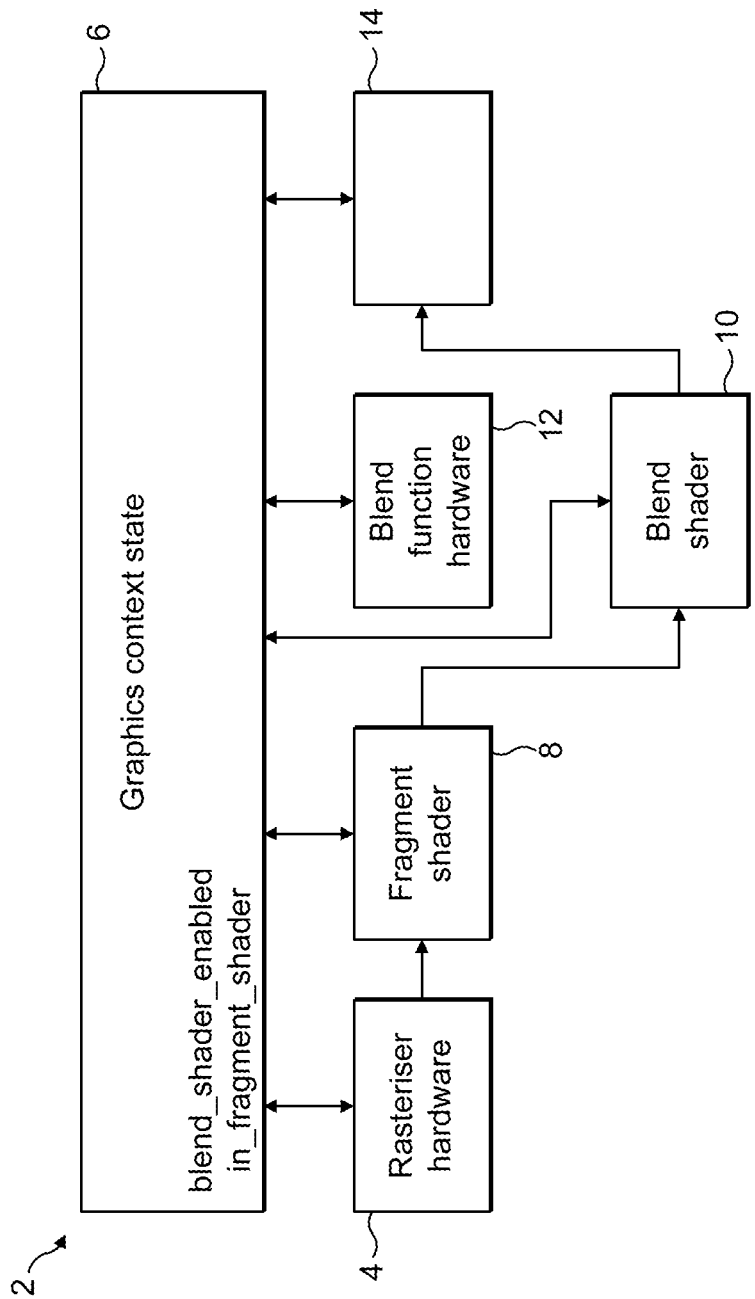
FIG. 2 schematically illustrates a portion of a graphics processing system including both dedicated blending function hardware and a blending software routine to be used in place of the dedicated blending function hardware.

FIG. 2 is a further schematic illustration of the graphics processing system 2. Rasterizer hardware 4 is responsible for reading graphics context state 6 specifying graphics primitives to be drawn (e.g. primitive triangles) and generating from these a stream of graphics fragments typically corresponding to sampling points to be drawn as part of the representation of the graphics primitive that has been rasterized. It will be appreciated that further graphics processing operations may be performed prior to the action of the rasterizer hardware 4, such as spatial transformations, vertex and primitive sorting etc.

The rasterizer hardware 4 generates a stream of data identifying fragments to be rendered. These are passed to fragment shader software 8 for a determination of the colour value(s) associated with each fragment. The fragment shader 8 is provided in the form of a software routine running on a general purpose processor of the graphics processing system 2. Typically, many general purpose processors will be provided in parallel within the graphics processing system so that multiple fragments may be processed in parallel and other processing operations performed in parallel.

The fragment shader 8 (current software routine) finishes with an end instruction. This end instruction branches back to itself until predetermined dependency conditions are met. In this way, further processing of a fragment colour value generated by the fragment shader 8 may be delayed until the proper point in the processing sequence is reached (corresponding to all the dependencies being met) and the fragment colour value can be passed forward for blending. Other arrangements would, of course, be possible.

The end instruction is decoded by an instruction decoder within the general purpose processor which is executing the fragment shader. The instruction decoder executing produces control signals which control how the blend processing is performed. The graphics context state 6 associated with the processing of that fragment value (an individual processing thread) includes a blend_shader_enabled flag as well as an in_fragment_shader flag. If when the end instruction is decoded the blend_shader_enabled flag is true, then this indicates that the blend processing should be performed by the blend shader 10 (further software routine) rather than dedicated blend function hardware 12. Both the dedicated blend function hardware 12 and the blend shader 10 are provided within the system. Thus, if the blend_shader_enabled flag is true then, the blend shader 10 will process the fragment colour value to perform the blend operation with a current fragment value at a corresponding position within the memory 14 to produce a software generated result fragment colour value which is written back to the corresponding position within the tile buffer (memory) 14. Alternatively, if the blend_shader_enabled flag is false, then the fragment colour value is processed by the dedicated blend function hardware 12 which is present by default to generate a hardware generated result fragment colour value which is again written to the tile buffer (memory) 14. Thus, the same end instruction within the fragment shader 8 (current software routine) may be used to trigger either use of the dedicated blend function hardware 12 or the blend shader 10 (further software routine) in dependence upon the blend_shader_enabled flag.

A further feature is the use of the in_fragment_shader flag. This is provided as the same end instructions can be used to terminate both the fragment shader 8 and the blend shader 10. When terminating the blend shader 10, it is inappropriate to trigger processing of the output from the blend shader 10 by a further blend shader 10. Thus, the end instruction will only invoke the blend shader 10 if the in_fragment_shader flag indicates that the general purpose processor was executing the fragment shader 8 when that end instruction was encountered and decoded.

Figure 3:
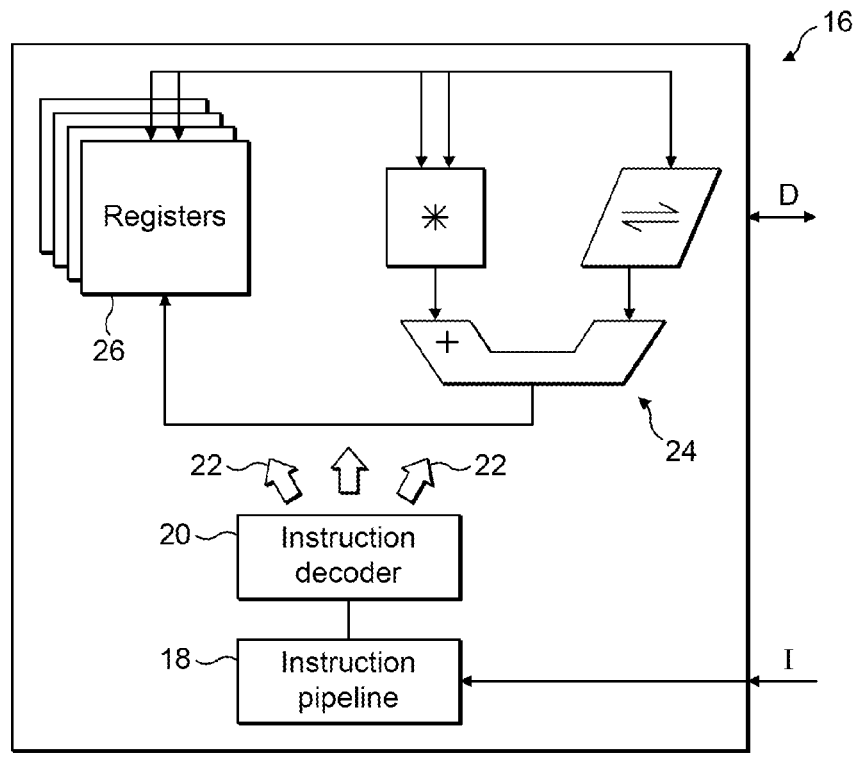
FIG. 3 schematically illustrates a general purpose processor responsive to a stream of program instructions.

FIG. 3 illustrates a general purpose processor 16 within a graphics processing unit of the type which may be used to execute the fragment shader 8 and/or the blend shader 10. Program instructions constituting the fragment shader 8 or the blend shader 10 are supplied to an instruction pipeline 18. An instruction decoder 20 is responsive to these program instructions to generate control signals 22 which control the processing operations performed by a data path 24 in processing data values stored within registers 26. The instruction decoder 20 can also control the processor 16 to store data to a separate memory and to read data from that separate memory. The registers 26 are illustrated in banked form indicative of a multi-threading capability of the processor 16 being facilitated by the use of switching between different registers banks when switching between threads of execution (different streams of program instructions).

Figure 4:
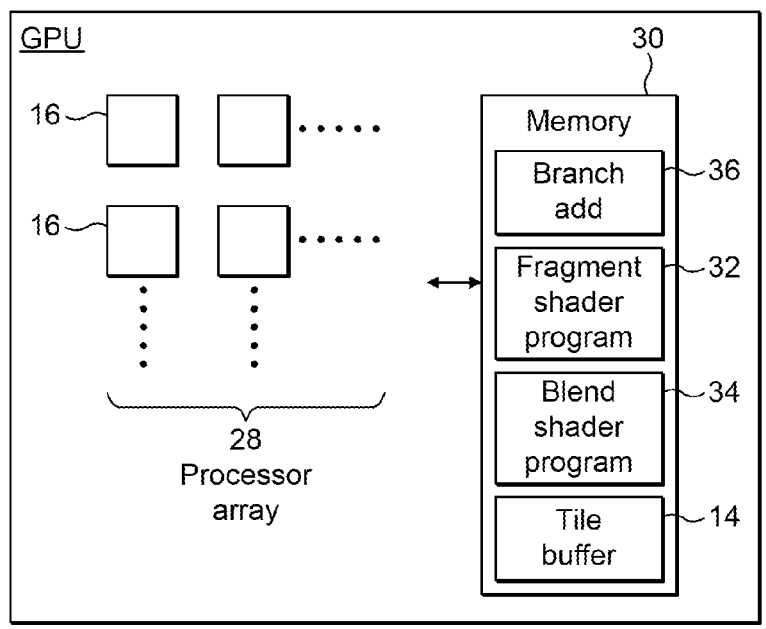
FIG. 4 schematically illustrates a graphics processing apparatus including an array of processors and a memory storing graphics context state and other data associated with the graphics processing.

FIG. 4 illustrates a graphics processing unit including an array 28 of the processors 16. Such an array 28 facilitates highly parallel processing of a type well suited for graphics processing operations.

FIG. 4 also shows a memory 30 which represents schematically all the memory to which the graphics processor has access (including off-chip memory, caches, dedicated on-chip memory, internal registers, etc.). Thus, memory 30 stores the fragment shader program 32 and the blend shader program 34 which is executed by individual instances of the processor 16. The memory 30 also includes the tile buffer 14 into which the result fragment colour values are assembled by the blend processing. The memory 30 further stores the graphics context state 6 together with a programmable branch target address 36 which indicates the start address of the blend shader program 34 which is to be executed when the end instruction triggers use of the further software routine (blend shader 10).

Figure 5:
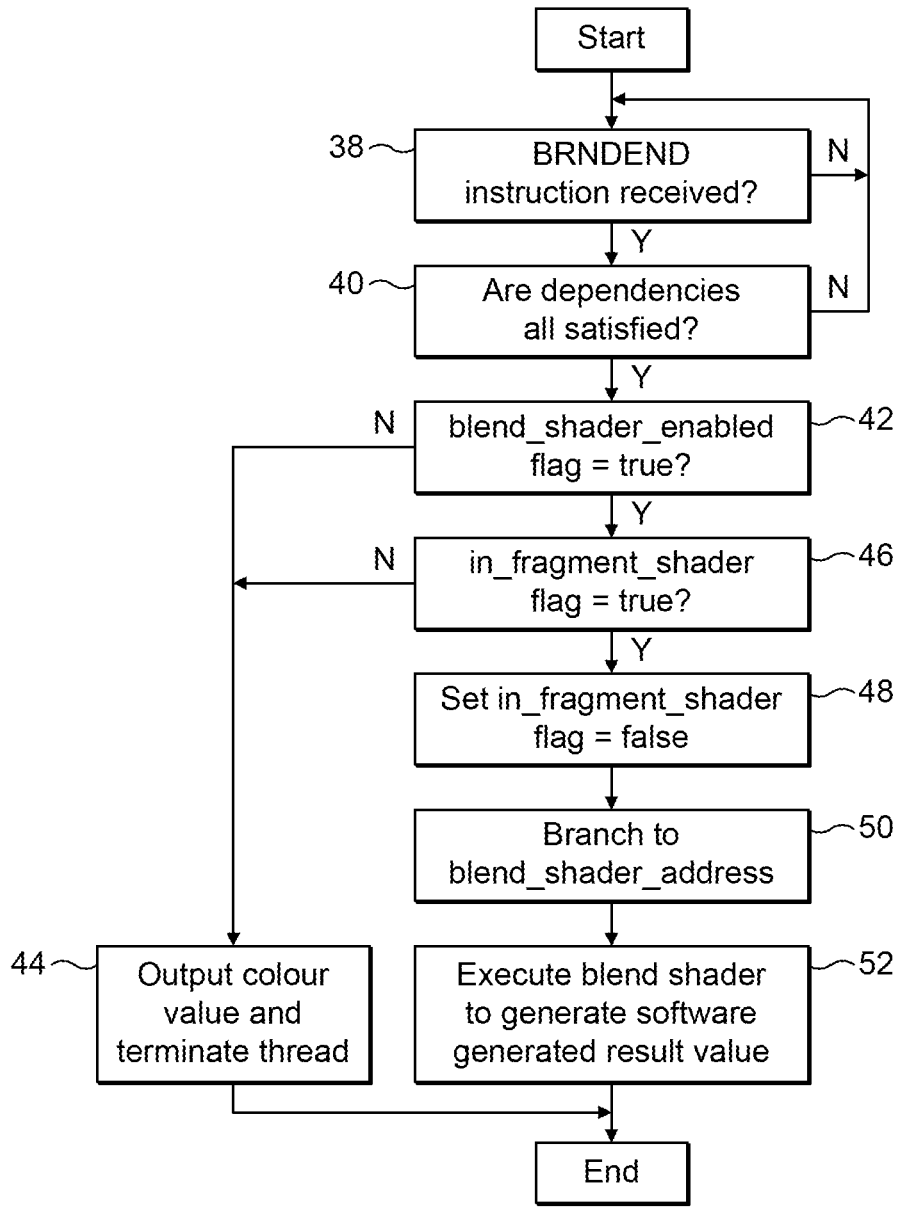
FIG. 5 is a flow diagram schematically illustrating the operation of an instruction decoder upon decoding an end instruction.

FIG. 5 is a flow diagram schematically illustrating the decoding of an end instruction. The end instruction has the mnemonic BRNDEND (branch no dependencies end). Step 38 waits until the end instruction is received. When the end instruction is received, then step 40 determines whether or not all the dependencies associated with that processing thread (and thereby with the end instruction) have been satisfied. When all the dependencies are not satisfied, processing returns to step 38.

When all of the dependencies are satisfied at step 40, then processing proceeds to step 42 where a determination is made as to whether the blend_shader_enabled flag is true. If the blend_shader_enabled flag is false, then processing proceeds to step 44 where the fragment colour value from the fragment shader 8 is output (e.g. written to the memory 30) and the fragment shader thread 8 for calculating that fragment colour value is terminated. The writing of the fragment colour value to the memory 30 triggers the dedicated blend function hardware 12 to read that fragment colour value from the memory 30 and commence its dedicated processing operation thereupon.

If the determination at step 42 is that the blend_shader_enabled flag is true, then processing proceeds to step 46 where a determination is made as to whether or not the in_fragment_shader flag is true. If the in_fragment_shader flag is false, then processing again proceeds to step 44. In this case the fragment colour value will again be output and the thread will be terminated. However, as the thread terminated is not a fragment shader 8, then it is inappropriate to invoke processing by the dedicated blend function hardware 12. The location to which the fragment colour value is stored as well as other state data serves to indicate whether or not the dedicated blend function hardware 12 should be invoked upon output of the fragment colour value at step 44.

If the determination at step 46 is that the in_fragment_shader flag is true, then processing proceeds to step 48 where the in_fragment_shader flag is set false. This is because the blend shader 10 is about to be invoked and accordingly the in_fragment_shader flag should indicate that the program instruction controlled processing that is about to take place is not fragment shader processing. Step 50 is a branch to a target address indicated by a blend_shader_address stored within the memory 30 and corresponding to a start address of the blend shader program 34. Step 52 executed the blend shader 10 and generates a result fragment colour value which is again written to the tile buffer (memory) 14.

FIG. 6 is pseudo code schematically illustrating the processing operations performed when an end-instruction 54 is decoded. These processing operations are as illustrated in FIG. 5.

Figure 7:
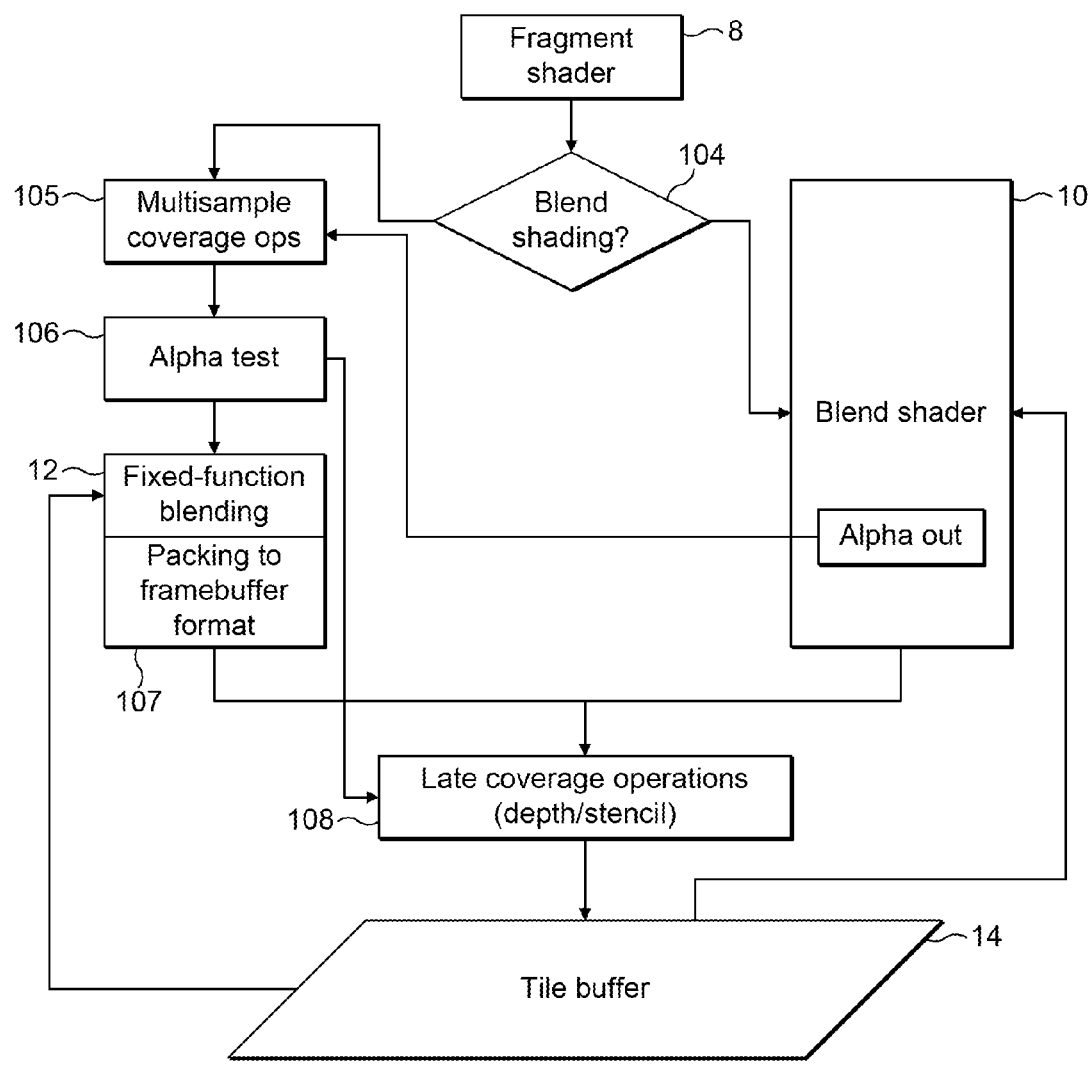
FIG. 7 shows schematically the graphics processing system of FIG. 1 operating in the manner of the technology described herein.

FIG. 7 shows schematically the operation of the graphics processing system shown in FIG. 1 (and in FIG. 2) when operating in accordance with the technology described herein. As shown in this figure, when the programmable blend shading path using the blend shader 10 is selected, the blend shader 10 is configured to provide the alpha value 110 generated by the fragment shading operation as an output to the fixed function hardware unit pipeline, and in particular to the multisample coverage operations unit 105 and the alpha test unit 106. The alpha test unit 106 is further configured to provide its appropriate output to the later coverage operations unit 108, as shown in FIG. 7. This then allows the alpha test on the alpha values generated by the fragment shader still to be performed using the multisample coverage operations hardware unit 105 and the alpha test hardware unit 106, instead of having to emulate those operations in the blend shading software routine in the blend shader 10.

In the present embodiment, the blend shader 10 is configured to provide the alpha value 110 to the hardware alpha test unit 106, etc., by including in the blend shading software routine that is being executed to blend the fragment data, an instruction that writes the fragment shading output alpha value to a specific register that the hardware then passes to the fixed function hardware units.

An example of this instruction is set out below in pseudo-code, using GLSL-like syntax (GLSL is the shading language used to write OpenGL shaders):

---

Fragment shader:
uniform sampler2D my_sampler;
vec2 in my_coordinates;
void main( )
{
    // Fetches a texel and makes it the output color.
    // The alpha component of gl_FragColor is needed by the
    fixed-function units.
    gl_FragColor = texture(my_sampler, my_coordinates);
}
Original blend shader:
// Assume that gl_FragColorIn is the output of the fragment shader's
gl_FragColor
// Assume that gl_FragColorOut is the final blended color.
// Assume that gl_Framebuffer is the value currently in the framebuffer
void main( )
{
    // Blend the incoming color with the value in the buffer
    gl_FragColorOut = (1.0 − glFragColorIn.a) * gl_Framebuffer +
    glFragColorIn.a *
glFragColor;
}
Modified blend shader that passes out the fragment shading alpha value
to the fixed-function
units:
// Assume that gl_FragAlpha is the replacement alpha value
void main( )
{
    // Provide the original alpha value to the fixed-function units
    gl_FragAlpha = gl_FragColor.a;
    // Blend the incoming color with the value in the buffer
    gl_FragColorOut = (1.0 − glFragColorIn.a) * gl_Framebuffer +
    glFragColorIn.a *
glFragColor;
}

---

The compiler is then configured to map gl_FragAlpha to a specific register that the hardware will pass to the fixed-function units.

In this embodiment, the software instruction is included in the blending software routine. It could instead be included in the fragment shading software routine (where programmable fragment shading is being used) (in which case the fragment shader will, in effect, output the alpha value to the dedicated function hardware).

Other arrangements for passing the alpha values generated by the fragment shading operations to the dedicated function hardware could be used. For example, the alpha output of the fragment shading operation could be automatically extracted by the dedicated function hardware by storing the alpha values into memory, with such a store operation being detected in hardware, and then triggering the operation of the dedicated alpha value processing hardware.

It would be possible to pass the fragment shading output alpha value to the dedicated function hardware immediately that output alpha value becomes available (e.g. is written to the appropriate register).

Alternatively, the provision of the output alpha value to the dedicated function hardware could be deferred (buffered), e.g., until the software blending operation has been finished (at which point it could be passed on to the dedicated function hardware along with the output data from the blending operation). This may, for example, simplify the implementation. It would also allow, for example, the final, correct alpha value to be processed by the hardware units in the case where a user, for example, provides multiple output values from the fragment shader. In this latter arrangement, an alternative would be for the alpha values to be provided to the fixed function units immediately and for those fixed function units to speculatively start processing those values, but to discard values and to start processing a new value if the fragment shader then outputs a new alpha value for processing.

In the above embodiment, if no deferring (buffering) of the alpha value was happening, the blend shader (or fragment shader, if the instruction is done in the fragment shader) would, on the assignment to gl_FragAlpha, immediately signal to the fixed-function hardware that the special alpha value was ready and that those units could begin processing. If the alpha value was buffered until the end of blend shading, the assignment to gl_FragAlpha would simply save the value in a register, which would be passed on to subsequent stages at the end of blend shading along with other registers (such as gl_FragColorOut).

Various alternatives and modifications to the above described embodiments would be possible. For example, although FIG. 7 shows the fragment shading alpha value 110 being output by the blend shader 10 when programmable blending is being used, as discussed above it would also be possible to configure the fragment shader 8 to provide that output value directly to the multisample coverage operation and alpha test hardware units 105, 106 when using programmable blending, if desired.

Similarly, although the above embodiments have been shown as having a separate "blend shader", it would be possible, e.g., to merge the programmable blending operations into the fragment shader, if desired.

Where the fragment shading operation output value can be provided to the dedicated processing hardware by means of a software instruction, then in an embodiment that instruction can be specified by a user (a programmer) in a fragment shader software routine (i.e. this functionality is exposed to users). For example, an OpenGL/OpenGL ES extension could be published which allows the user to perform this replacement in the fragment shader.

This would then allow users to use this mechanism as an extra output channel from the fragment shader. It would also allow the actual alpha channel to be used for other purposes.

As an example of this, the drawing of tall grass will be considered. Grass might be both translucent (which blending handles well), and have varying density in different areas (which alpha-to-coverage and the alpha test handle well). In standard OpenGL, both functions would be driven by a single alpha value. With the technology described herein, separate values could be provided for each, using a fragment shader program for example of the form:

```
uniform sampler2D color_and_opacity;
uniform sampler2D density_map;
in vec2 coordinates;
void main( )
{
    // Set the grass color, and its opacity which will be used in blending.
    gl_FragColor = texture(color_and_opacity, coordinates);
    // Set the density. Densities nearer zero will cause pixels to be
    complete dropped, rather than blended.
    gl_FragAlpha = texture(density_map, coordinates);
}
```

This pseudo-code is similar to the pseudo-code shown earlier, in that there is an assignment to a new special variable (gl_FragAlpha), but this time it is the user-provided fragment shader routine that is performing this process, rather than the implementation-generated blend shader routine.

In these arrangements, deferring the provision of the output alpha value to the dedicated function hardware (as discussed above) would allow the user to make multiple replacement operations for the fragment shading output alpha value (i.e., to in effect, change their mind), with only the "correct" final value being processed in hardware. Alternatively, the hardware units could speculatively start processing the output values as they are generated, but restart each time a new output value is generated.

It can be seen from the above that the technology described herein allows, for example, alpha test and alpha-to-coverage fixed function hardware units of a graphics processing pipeline to be used at the same time as a programmable blending routine. This has the advantage that because it is likely to be more power efficient to use the fixed function hardware units for the alpha test, etc., rather than trying to emulate their functionality in the blending software routine, the technology described herein can provide improved efficiency and lower power usage when using programmable blending.

This is achieved in the embodiments of the technology described herein at least by allowing the fragment and/or blend shader to pass the alpha value to the fixed function alpha test and alpha-to-coverage units of the rendering pipeline, when programmable blending is being performed.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system in which, following fragment shading operations to generate fragment shading output data, blending may be performed selectively either using fixed-function blending hardware or by performing a blending software routine, the method comprising:

performing fragment shading operations to generate fragment shading output data;

selecting to blend fragment shading output data by either using fixed-function blending hardware or by performing a blending software routine;

if said selecting to perform blending is by performing the blending software routine, performing blending using a blending software routine to blend fragment shading output data from the graphics fragment shading operations with previously stored graphics data to generate modified graphics fragment output data;

providing at least some output data generated by the fragment shading operation to dedicated function hardware of the graphics processing system; and processing the at least some output data generated by the fragment shading operation by the dedicated function hardware to generate hardware generated result data from the at least some output data generated by the fragment shading operation, wherein the at least some output data generated by the fragment shading operation that is provided to the dedicated function hardware when performing blending using the blending software routine comprises graphics alpha values generated by the fragment shading operation;

the dedicated function hardware performs at least one of alpha test and alpha-to-coverage operations on the alpha values to generate at least one of hardware generated alpha test result data and hardware generated alpha-to-coverage result data from the alpha values generated by the fragment shading operation; and if said selecting to blend fragment shading output data is by using fixed-function blending hardware, generating modified graphics fragment output data by said fixed-function blending hardware based on the fragment shading output data.

2. The method of claim 1, wherein the at least some graphics alpha values generated by fragment shading operation is provided to the dedicated function hardware when performing blending using the blending software routine by including an appropriate software instruction in a software routine that is being executed.

3. The method of claim 2, wherein the software instruction is included in the blending software routine.

4. The method of claim 2, wherein the software instruction is included in a fragment shading software routine.

5. The method of claim 4, wherein the software instruction can be specified by a user in a fragment shading software routine.

6. The method of claim 1, wherein the provision of the graphics alpha values to the dedicated function hardware is deferred until the software blending operation has been finished.

7. A graphics processing apparatus comprising:

processing circuitry configured to perform graphics fragment shading operations to generate fragment shading output data and operable to perform graphics blending software routines to blend output data from the graphics fragment shading operations with previously stored graphics data to generate modified graphics fragment output data; and dedicated function hardware configured to receive output data from said fragment shading operations and to perform dedicated processing operations upon the fragment shading output data, the dedicated processing operations including at least graphics blending operations to blend output data from the graphics shading operations with previously stored graphics data to generate modified graphics fragment output data; and processing circuitry configured to select between performing graphics blending operations on the output data from the graphics fragment shading operations either using one of the dedicated function hardware or a blending software routines performed by the processing circuitry;

wherein if the dedicated function hardware is used, hardware generated result data is generated by said dedicated function hardware from the output data generated by the fragment shading operation, else if performing blending using the blending software routine performed by the processing circuitry operable to perform graphics blending software routines, the graphics processing apparatus is configured to still provide at least some output data generated by the fragment shading operation to the dedicated function hardware of the graphics processing apparatus for processing by the dedicated function hardware to generate hardware generated result data from the at least some output data generated by the fragment shading operation;

wherein the at least some output data generated by the fragment shading operation that is provided to the dedicated function hardware when performing blending using the blending software routine comprises graphics alpha values generated by the fragment shading operation; and when performing blending using a blending software routine the dedicated function hardware performs at least one of alpha test and alpha-to-coverage operations on the alpha values to generate at least one of hardware generated alpha test result data and hardware generated alpha-to-coverage result data from the alpha values generated by the fragment shading operation.

8. The apparatus of claim 7, wherein the processing circuitry comprises a programmable processor that performs both the fragment shading operations and the graphics blending software routines.

9. The apparatus of claim 7, wherein the dedicated function hardware of the graphics processing apparatus further comprises at least one of: an alpha test unit, a multisample coverage operations unit, an alpha-to-coverage unit, and a packing to frame buffer unit.

10. The apparatus of claim 7, wherein the graphics alpha values generated by fragment shading operations is provided to the dedicated function hardware when performing blending using blending software routine by including an appropriate software instruction in a software routine that is being executed.

11. The apparatus of claim 10, wherein the software instruction is included in the blending software routine.

12. The apparatus of claim 10, wherein the software instruction is included in a fragment shading software routine.

13. The apparatus of claim 12, wherein the software instruction can be specified by a user in a fragment shading software routine.

14. The apparatus of claim 7, wherein the provision of the output data to the dedicated function hardware is deferred until the software blending operation has been finished.

15. A non-transitory computer readable storage medium storing computer software code which when executing on a processor performs a method of operating a graphics processing system in which, following fragment shading operations to generate fragment shading output data, blending may be performed either using fixed-function blending hardware or by performing a blending software routine, the method comprising:

performing fragment shading operations to generate fragment shading output data;

selecting to blend fragment shading output data by either using fixed-function blending hardware or by performing a blending software routine;

if said selecting to perform blending is by performing a blending software routine, performing blending using the blending software routine to blend fragment shading output data from the graphics fragment shading operations with previously stored graphics data to generate modified graphics fragment output data;

providing at least some output data generated by the fragment shading operation to dedicated function hardware of the graphics processing system; and processing the at least some output data generated by the fragment shading operation by the dedicated function hardware to generate hardware generated result data from the at least some output data generated by the fragment shading operation; wherein the at least some output data generated by the fragment shading operation that is provided to the dedicated function hardware when performing blending using blending software routine comprises graphics alpha values generated by the fragment shading operation; and the dedicated function hardware performs at least one of alpha test and alpha-to-coverage operations on the alpha values to generate at least one of hardware generated alpha test result data and hardware generated alpha-to-coverage result data from the alpha values generated by the fragment shading operation; and if said selecting to blend fragment shading output data is by using fixed-function blending hardware, generating modified graphics fragment output data by said fixed-fiction blending hardware based on the fragment shading output data.

\* \* \* \* \*